(12) United States Patent
Gold et al.

(10) Patent No.: US 7,374,240 B2
(45) Date of Patent: May 20, 2008

(54) CUSHIONED SEAT PROTECTOR (75) Inventors: Katherine Gold, Denver, CO (US); Lynn Rosen, Parker, CO (US)

(73) Assignee: Gold Bug, Inc., Aurora, CO (US)

( * ) Notice: Subject to any disclaimer, the term of this patent is extended or adjusted under 35 U.S.C. 154(b) by 0 days.

(21) Appl. No.: 11/584,192

(22) Filed: Oct. 20, 2006

(65) Prior Publication Data

US 2008/0093900 A1   Apr. 24, 2008

(51) Int. Cl.
*A47C 31/00* (2006.01)
*A47C 7/62* (2006.01)

(52) U.S. Cl. ............. 297/219.12; 297/229; 297/188.01

(58) Field of Classification Search ........... 297/219.12, 297/229, 188.01, 219.1, 228.1, 253; 5/655
See application file for complete search history.

(56) References Cited

U.S. PATENT DOCUMENTS

| | | | |
|---|---|---|---|
| 1,954,376 A * | 4/1934 | Brueckl | 297/253 |
| 4,666,207 A * | 5/1987 | Quartano | 297/229 |
| 4,676,549 A | 6/1987 | English | |
| 5,294,166 A * | 3/1994 | Shapland | 296/97.23 |
| 5,346,278 A * | 9/1994 | Dehondt | 297/219.1 |
| 5,806,925 A | 9/1998 | Hanley | |
| 5,809,595 A * | 9/1998 | Stevens et al. | 5/653 |
| 5,954,404 A | 9/1999 | Suzuki | |
| 5,957,528 A * | 9/1999 | Campbell | 297/228.12 |
| 6,389,624 B1 | 5/2002 | Madole | |
| 6,394,543 B1 | 5/2002 | Dunne et al. | |
| 6,752,457 B2 * | 6/2004 | Gold et al. | 297/219.12 |
| 6,786,546 B2 | 9/2004 | McConnell et al. | |
| 7,207,627 B2 * | 4/2007 | Jerome | 297/219.1 |

OTHER PUBLICATIONS

Sunshine Kids Juvenile Products USA, "Super Mat," (packaging for goods), purchased Dec. 2005, publication date unknown.

* cited by examiner

*Primary Examiner*—Milton Nelson, Jr.
(74) *Attorney, Agent, or Firm*—The Reilly Intellectual Property Law Firm, P.C.; Ellen Reilly; John E. Reilly (57) ABSTRACT

A cushioned, articulated seat protector for vehicle seats or the like having mid-section and upper members with articulated panel sections and padded side panel members with a non-slid exterior, as well as a lower member having at least one pocket panel.

15 Claims, 7 Drawing Sheets

CUSHIONED SEAT PROTECTOR

An article of manufacture relating generally to a seat protector and more particularly to a cushioned, non-slip cover for placement between an infant car seat and a vehicle seat.

BACKGROUND AND FIELD

Present day infant car seats are typically placed directly on a vehicle seat causing unsightly indentations on the vehicle seat and the infant car seat can easily slip on most vehicle seat surfaces. Further, spills and infant shoes can cause stains on the vehicle seat as well. While seat protectors are known in the prior art, the excessive amount of padding makes them unwieldy and the designs do not insure secure retention to a vehicle seat. It is desired then to have a seat covering that has a non-slip surface, protects a vehicle seat and is easy to use and clean.

SUMMARY

The present embodiments are designed to provide a novel and improved cushioned seat protector having a mid-section member, side panel members, opposite end portions extending from the mid-section member. The seat protector has an elongated pad having a top surface and a bottom surface joined to the top surface with outer, reinforced edges, the mid-section member having articulated panel sections, means for folding the seat protector at spaced transverse intervals, the side panel members having padded panels with a non-slip exterior, and the opposite end portions each having side panel members, and one of the opposite end portions having at least one pocket panel. The articulated panel sections have intermittent stitching and the folding means is defined by a living hinge or separation of seams between one of the mid-section panel sections and side panel members. The bottom surface of the protector has a retaining member with a padded end having at least one exterior, textured surface.

Exemplary embodiments are illustrated in reference to Figures of the drawings. It is intended that the embodiments and Figures disclosed herein are to be considered illustrative rather than limiting. In addition to the article of manufacture described above, further aspects and embodiments will become apparent by reference to the drawings and by study of the following descriptions.

DETAILED DESCRIPTION

Figure 1:
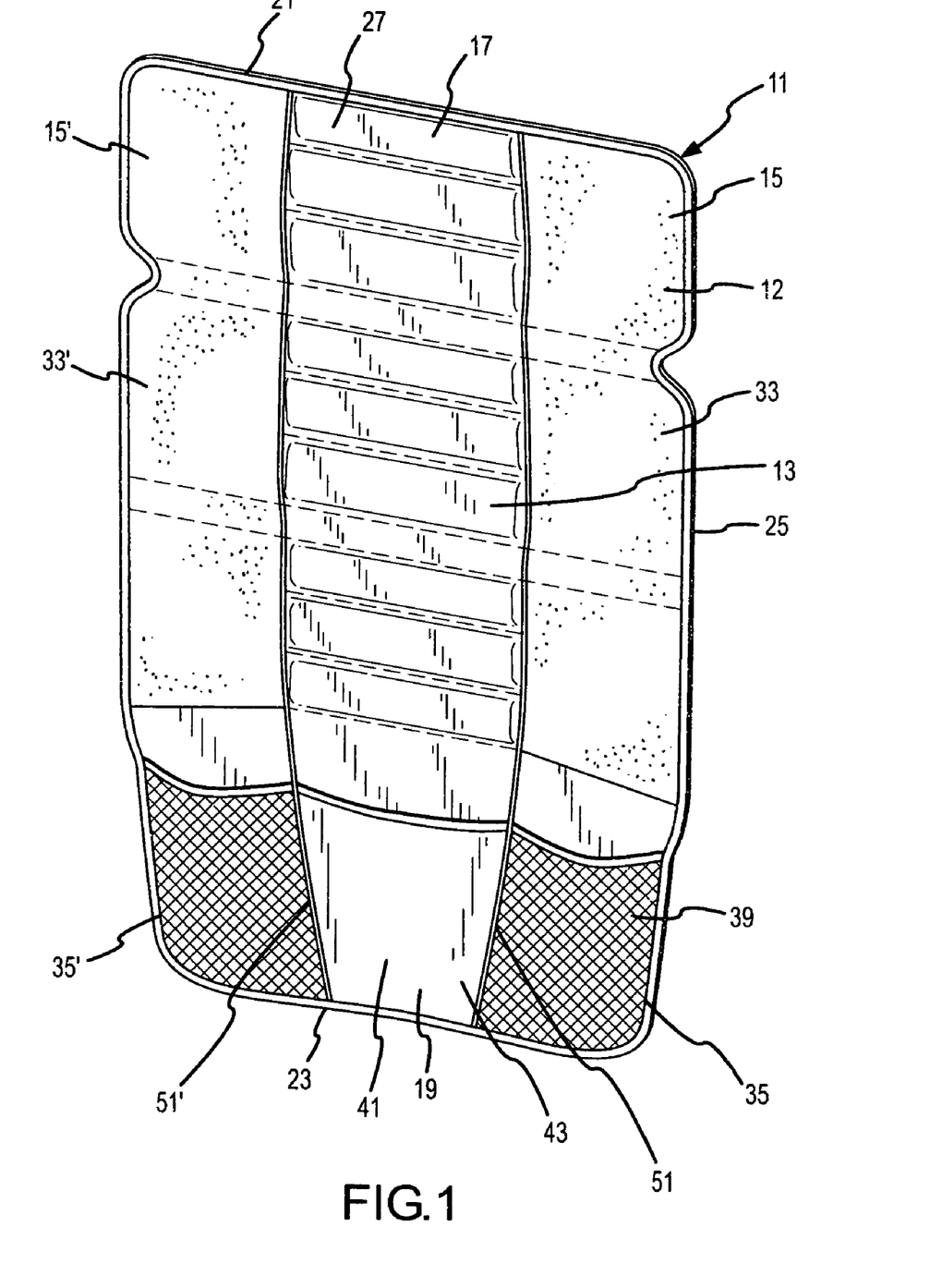
FIG. 1 is a perspective view of one form of vehicle seat cover for an infant seat.
Figure 2:
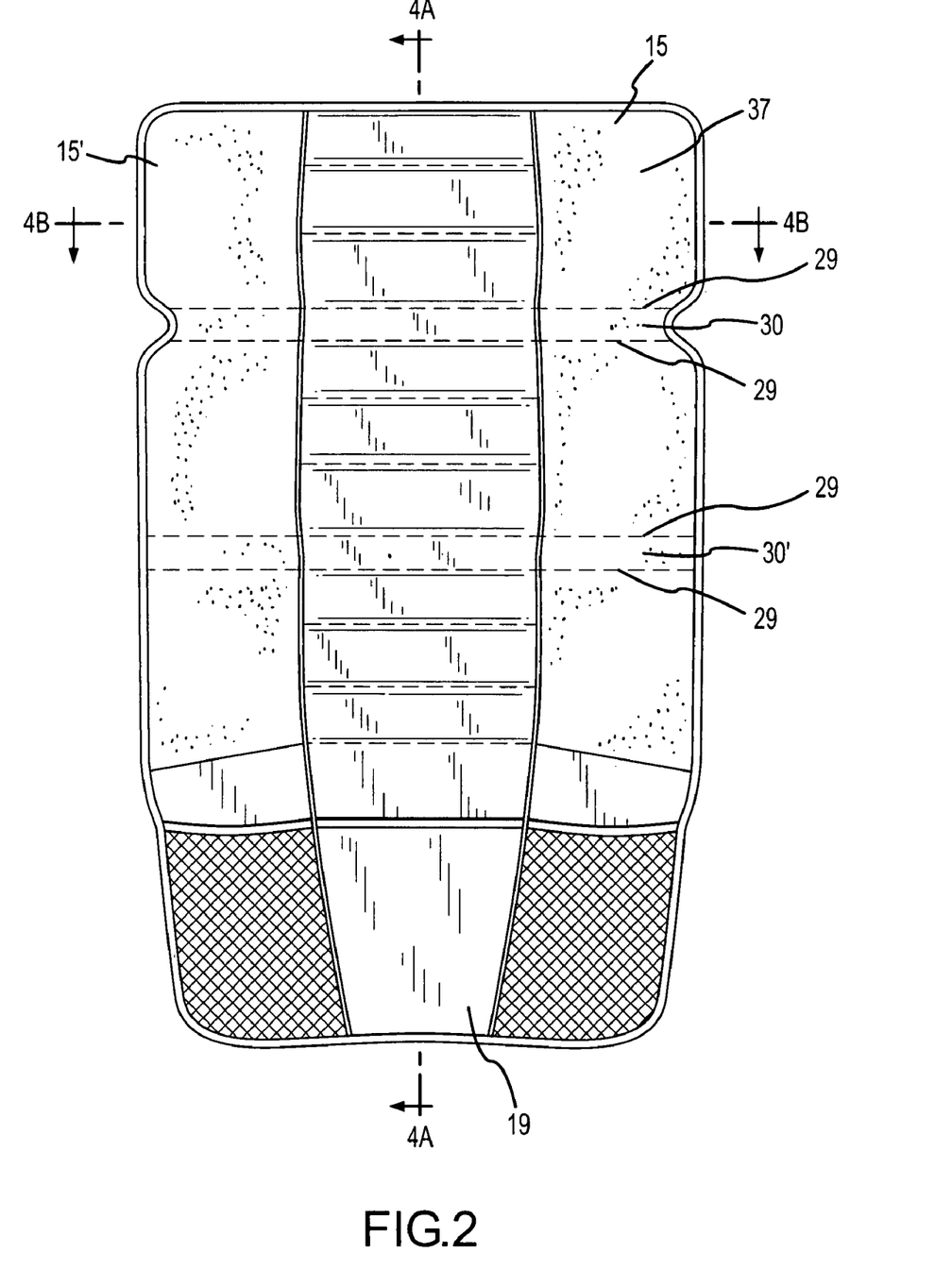
FIG. 2 is a top plan view of the seat cover of FIG. 1.
Figure 3:
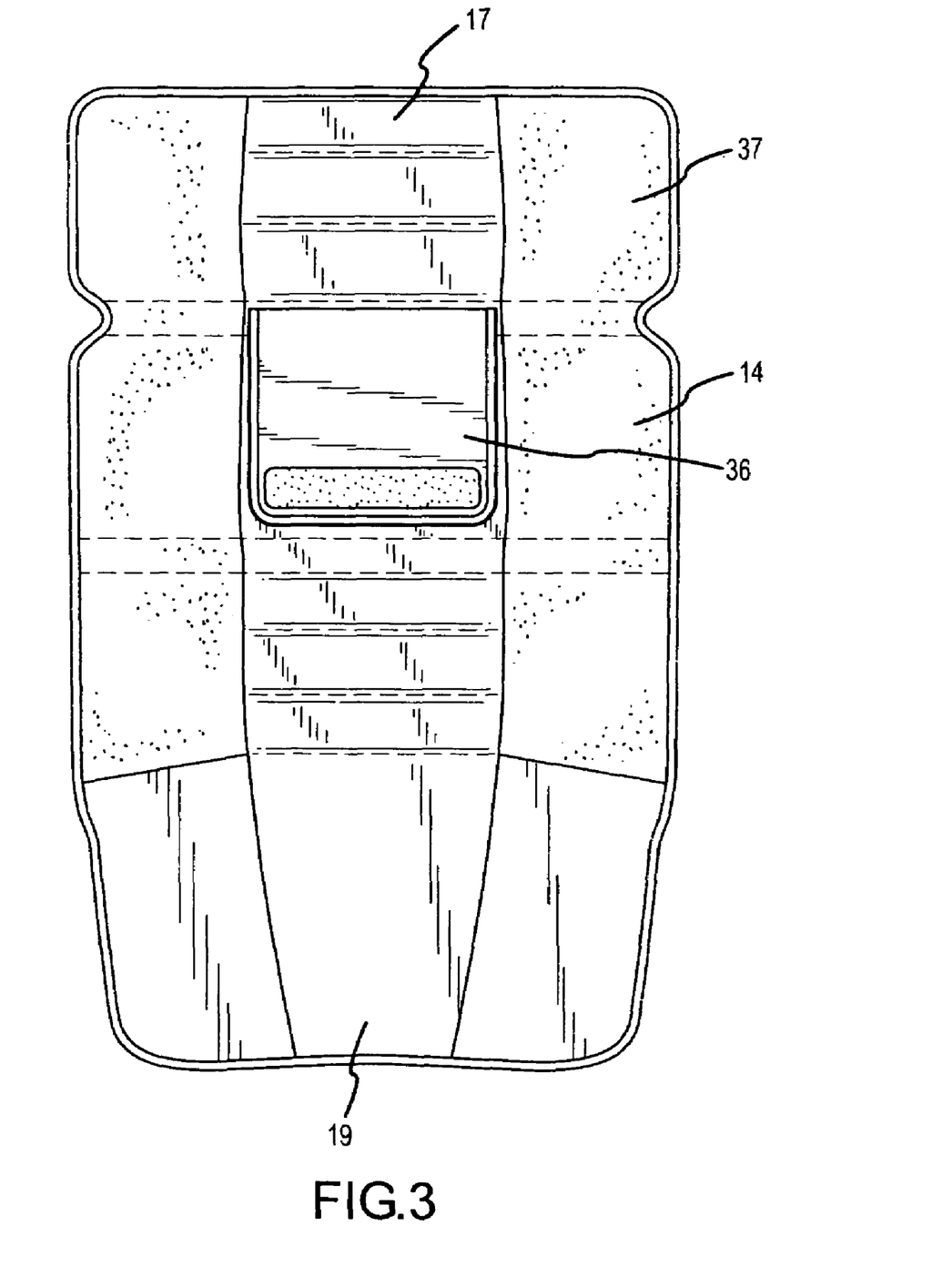
FIG. 3 is a bottom plan view of the seat cover of FIG. 1.

Referring to FIGS. 1-7, there is shown one form of an articulated seat protector 11 in the form of an elongated rectangular pad having a top sheet portion or surface 12 and a bottom sheet portion or surface 14 joined together with outer, reinforced edges 25, a mid-section member 13 (also referred to as the center, intermediate portion 13), opposite end portions 17 and 19, respectively, extending from the mid-section member 13. The end portion 17 and mid-section member 13 have padded lateral panel members 15, 15' and 33, 33'. The end portion 17 has an elongated top surface 21 and a corresponding, elongated bottom surface 23 along the opposite end portion 19 that has side pocket panels 35, 35', as shown in FIG. 2.

Figure 4A:
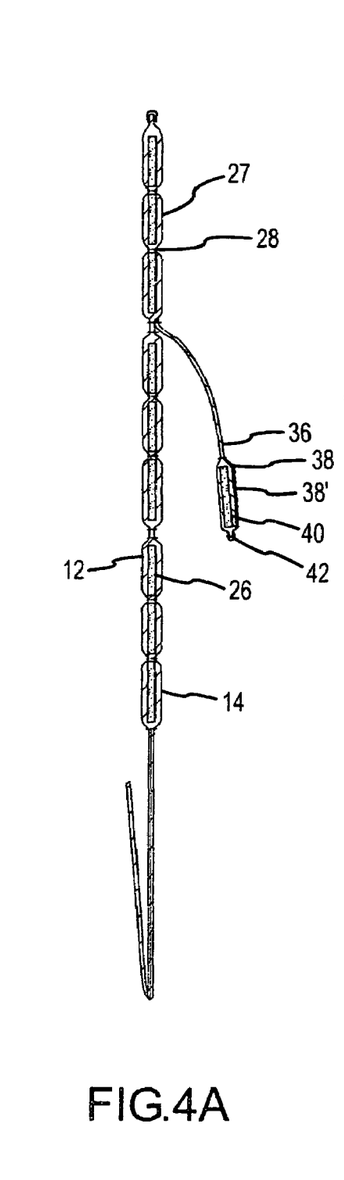
FIG. 4A is a side view in cross-section about lines 4A-4A of FIG. 2.
Figure 4B:
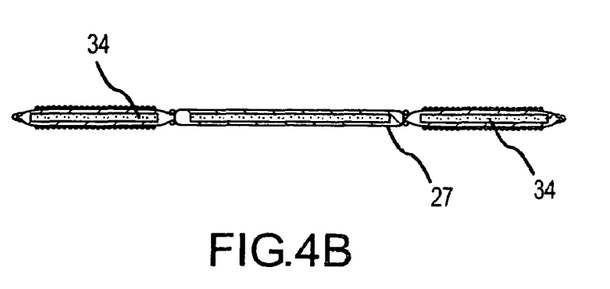
FIG. 4B is a transverse view in cross-section about lines 4B-4B of FIG. 2.
Figure 5:
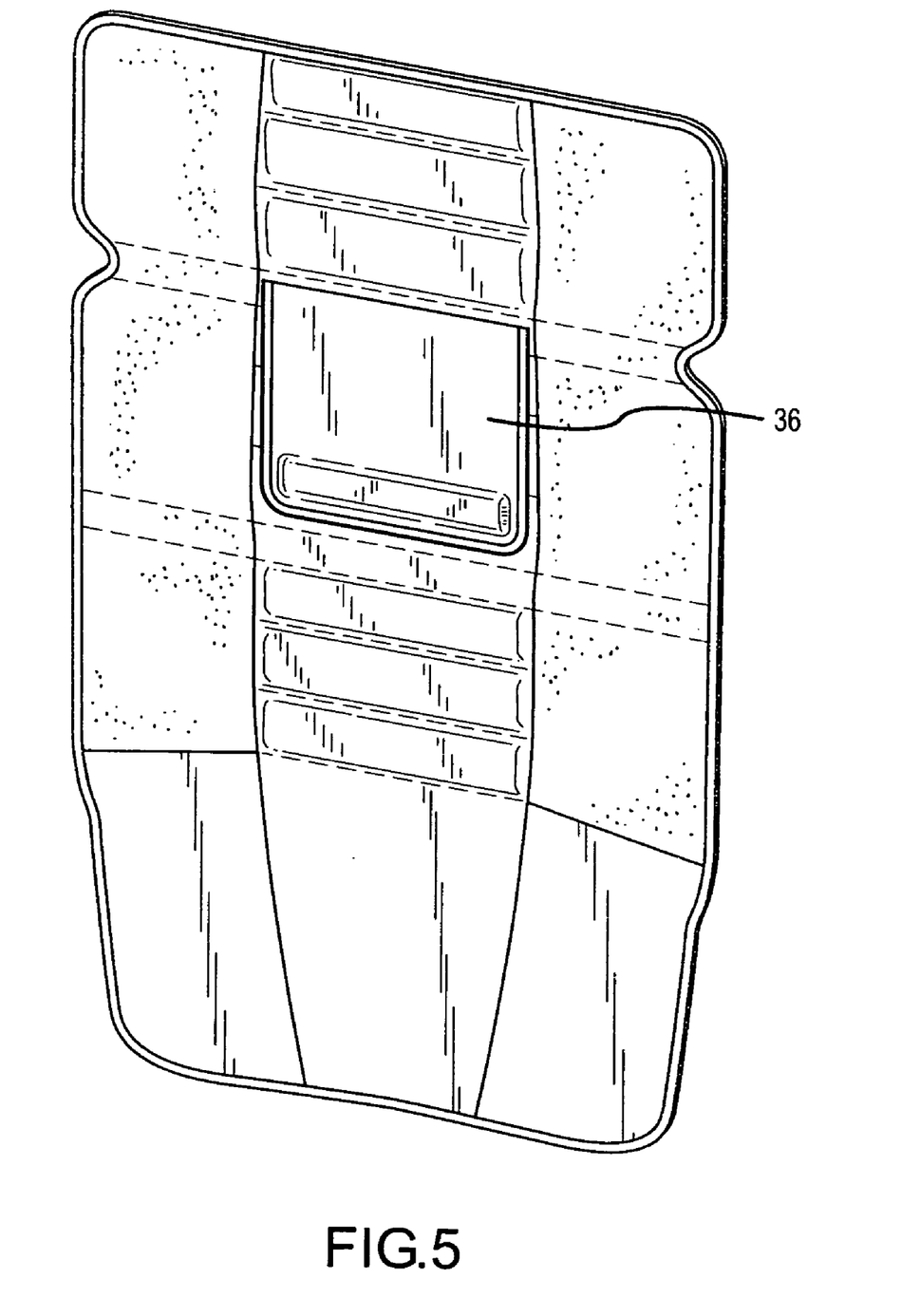
FIG. 5 is a bottom perspective view of the seat cover of FIG. 1.
Figure 7:
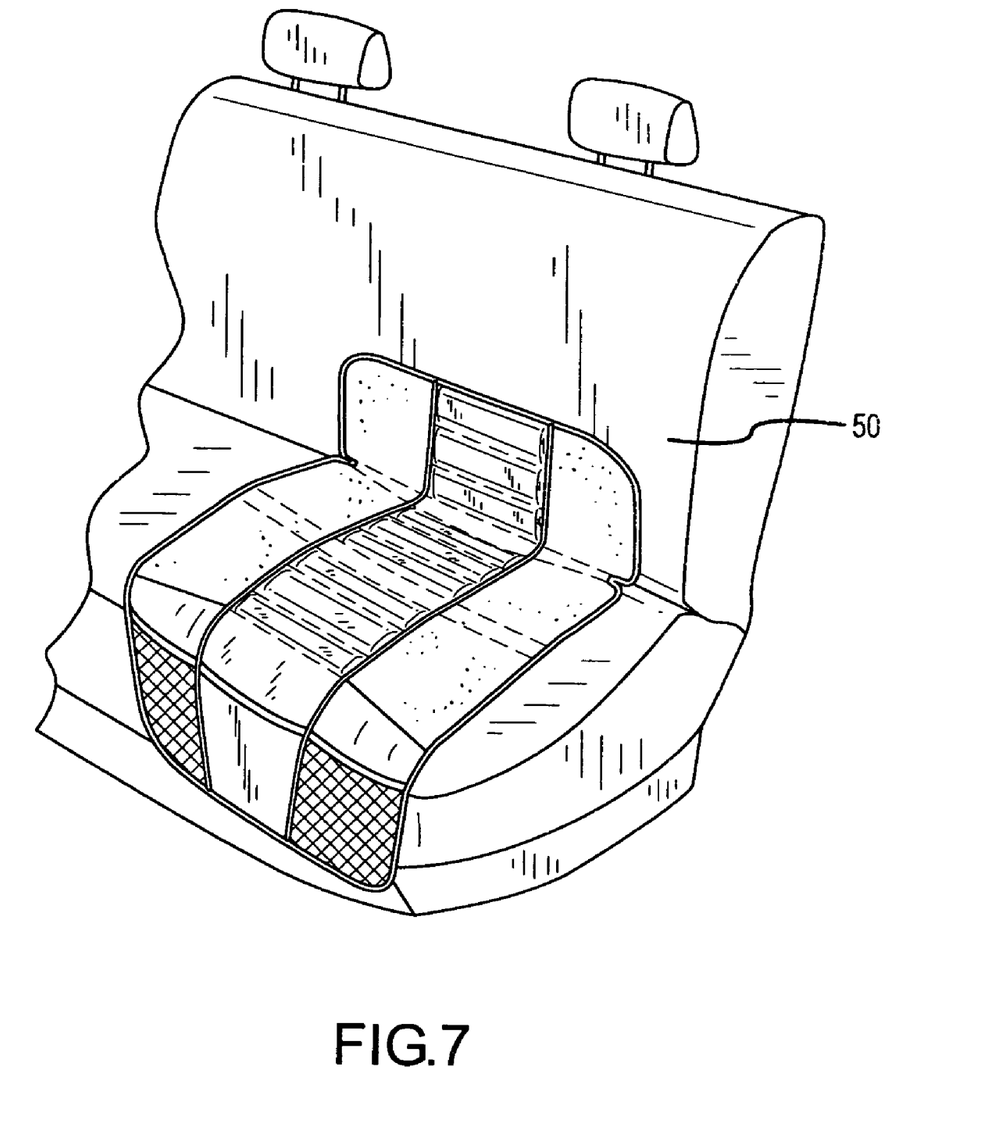
FIG. 7 is a perspective view of an installed seat cover of FIG. 1.

The top surface 12 and the bottom surface 14 are made of a durable nylon, washable material that is stain-resistant. The mid-section member 13 and the end portion 17 are defined by articulated panel sections 27 as shown in FIGS. 1, 4A and 4B. The top and bottom surfaces 12 and 14 of the end portion 17 and mid-section member 13 are separated by a series of individual padded rectangles 26, the surfaces 12 and 14 are sewn or otherwise seamed together at spaced intervals 28 between the pads 26. The pads 26 may also have a different configuration such as a square and the padding may be of a variety of thicknesses. The articulated padded panel sections 27 are designed to protect a vehicle seat 50, as shown in FIG. 7, from damage by an infant car seat or the like while also providing spaced indentations to minimize slippage of the seat protector. The mid-section 13 has a width greater than the respective lateral panel members 15, 15' and the articulated panel sections 27 have a dimension on the order of 10½" by 2½", but may also be of varied dimensions. The lateral panel members 15, 15' and 33, 33' are defined by padded members 34 of an elongated, rectangular or square shape covered with exterior top and bottom surfaces that are made up of a rough, friction creating surface 37. By way of example and not limitation, the surface 37 may be made of a rubberized fabric or textured material. The textured surface creates friction and slight gripping with another surface such as a vehicle seat surface. This surface 37 aids in preventing slippage of an infant car seat as well as the seat protector and is easily cleaned. The end portion 19, typically made of vinyl or some other stain resistant type material, has side pocket panels 35, 35' that have a mesh covering 39 and a center pocket 41 with a fabric covering 43. In one embodiment, the end portion 19 is not cushioned or padded. The side pocket panels 35, 35' and 41 may have a variety of dimensions and any combination of pocket coverings. The pocket panels are provided for convenient storage of items such as toys, cups and other miscellaneous items.

Figure 6:
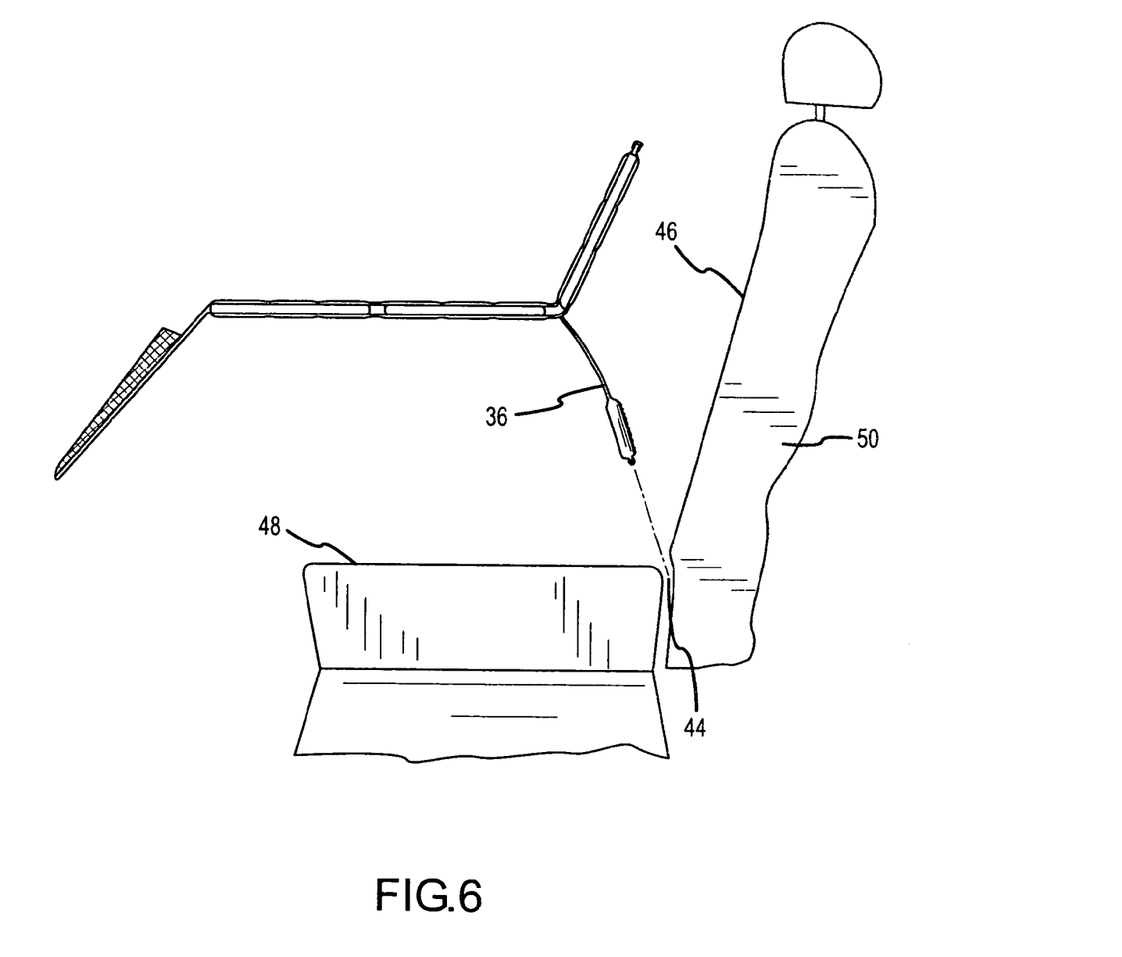
FIG. 6 is a partially exploded side view of the seat cover of FIG. 1.

The seat protector also has seams 30, 30' located transversely along the mid-section 13 of the cover 11. The primary seam 30 and secondary seam 30' are defined by continuous transverse stitching 29 which unites the surfaces 12 and 14 between the pads and traverses both the mid-section and side flaps at opposite ends and middle of the cover 11 with seams along the mid-section member 13. The secondary seam 30' is located closer to the end portion 19 along a mid-portion of the mid-section 13. There is an absence of padding along the stitching or seam 29 thereby facilitating the folding of these portions. The primary seam 30 allows the seat protector to be placed along a lower portion of a vehicle seat as shown in FIGS. 6 and 7. Alternatively, the secondary seam 30' allows the seat protector to be aligned with the end portion 17 and a portion of the mid-section member 13 aligned along a vehicle seat back for greater protection of the seat back. The end portion 19 and remaining mid-section may be aligned along the vehicle seat bottom 48 with the secondary seam 30' aligned with an intersection 44 of the vehicle seat back 46 and the vehicle seat 48. The primary and secondary seams 30, 30' allow for more versatility in the use of the seat protector. If a user desires protection along the vehicle seat back 46, the seat protector 11 can be moved to a different position.

The articulated mid-section 13 defines an uneven surface that aids in preventing slippage of an infant car seat (not shown) when placed on the surface of the seat protector 11 as shown in FIG. 6 and FIG. 7. The bottom surface 14 of the protector 11 has a retaining or securing member 36 as shown in FIGS. 3, 4A, 5 and 6. The retaining member 36 consists of a panel of fabric 38 having a padded end 40 and reinforced edges 42 along the outer perimeter of the retaining member 36. The padded end 40 has at least one exterior surface 38' with a rubberized or textured surface to aid in retention of the retaining member 36 in the space 44. The retaining member 36 is designed to be placed in the space 44, between the vehicle seat back 46 and the vehicle seat bottom 48. The padded end 40 acts as a guard, preventing the seat protector 11 from easily disengaging from a vehicle seat 50. This is shown in FIG. 6.

The articulated mid-section 13 provides a padded surface for an infant's legs and the friction-creating surface 37 provides a novel, textured surface for a child to rub their legs on. The side panel members 15, 15', 33, 33' and the pocket panels 35, 35' are divided by longitudinal seams 51, 51' from the mid-section member and are foldable in flush engagement with the opposite end portions 17 and 19, and mid-section member 13.

In use, the seat protector 11 may be placed on the vehicle seat 50 in a number of different orientations as discussed above. An infant car seat may then be placed on top of the seat protector. In this way, the seat protector helps to prevent permanent indentations in the vehicle seat 50 from the infant car seat as well as providing a protective covering for the seat 50 in case of spills and other accidents. The seat protector 11 is also easily foldable for storage when not in use.

It is therefore to be understood that while different embodiments are herein set forth and described, the above and other modifications may be made therein without departing from the spirit and scope of the article of manufacture as defined by the appended claims and reasonable equivalents thereof.

We claim:

1. A padded seat protector defined by a mid-section member, opposite end portions extending from said mid-section member, and side panel members extending laterally from said mid-section member, said seat protector comprising:
   an elongated pad having a top surface and a bottom surface joined to said top surface with outer, reinforced edges;
   said mid-section member having articulated panel sections;
   seams traversing said mid-section member and said side panel members at spaced transverse intervals;
   said side panel members having padded panels with a non-slip exterior;
   said opposite end portions each having secondary side panel members; and
   one of said secondary side panel members having at least one pocket panel.

2. The seat protector according to claim 1 wherein said articulated panel sections include individual flat, oblong pads surrounded by said top and bottom surfaces seamed at spaced intervals between said pads.

3. The seat protector according to claim 1 wherein said seams are defined by continuous stitching which unites said top and bottom surfaces and traverses both said mid-section member and said side panel members at opposite ends.

4. The seat protector according to claim 1 wherein said mid-section member has a width greater than each of said side panel members.

5. The seat protector according to claim 1 wherein said side panel members are divided by longitudinal seams from said mid-section member.

6. A seat protector having a padded center portion, padded side panels extending from said center portion, said center portion and said side panels defined by top and bottom surfaces joined by outer, reinforced edges, said seat protector comprising:
   opposite end portions extending from said center portion and said side panels;
      said side panels having a textured, non-slip exterior;
      primary and secondary seams defined by continuous stitching which unites said top and bottom surfaces and traverses both said center portion and said side panels at spaced transverse intervals;
      means for securing said seat protector to a seat; and
      said center portion having a width greater than each of said side panels.

7. The seat protector according to claim 6 wherein said side panels are inwardly foldable in flush engagement with said center portion.

8. The seat protector according to claim 6 wherein said textured, non-slip exterior includes a rubberized material.

9. The seat protector according to claim 6 wherein said primary and secondary seams include a living hinge.

10. The seat protector according to claim 6 wherein said securing means includes a padded flap with at least one textured, rubberized exterior surface connected to said bottom surface of said seat protector.

11. The seat protector according to claim 6 wherein said center portion includes transverse articulated sections.

12. A cushioned seat pad, said pad having an upper sectioned portion, an intermediate sectioned portion and a lower portion; said pad comprising;
   an elongated member having a top surface joined to a bottom surface with reinforced edges;
      said upper and intermediate sectioned portions having side flap members with a textured, rubberized top and bottom surface;
      said intermediate sectioned portion having transverse articulated sections;
      said lower portion having opposite side pocket panels;
      means for securing said seat pad to a vehicle seat; and
      longitudinal seams dividing said upper, intermediate and lower portions from said side flap members and said side pocket panels.

13. The seat pad according to claim 12 wherein said side flap members include padded panels.

14. The seat pad according to claim 12 wherein said securing means includes a flap member attached to a bottom surface of said seat pad.

15. The seat pad according to claim 12 wherein said upper and intermediate portions including said side flap members are defined by a separation between said upper and intermediate sectioned portions.

* * * * *

UNITED STATES PATENT AND TRADEMARK OFFICE
CERTIFICATE OF CORRECTION

PATENT NO.        : 7,374,240 B2
APPLICATION NO.   : 11/584192
DATED             : May 20, 2008
INVENTOR(S)       : Katherine Gold and Lynn Rosen Page 1 of 1

It is certified that error appears in the above-identified patent and that said Letters Patent is hereby corrected as shown below:

On the title page, item [57]:

In the Abstract:

In Line 4, cancel "non-slid" and substitute -- non-slip --.

Signed and Sealed this

Twenty-sixth Day of August, 2008

JON W. DUDAS
*Director of the United States Patent and Trademark Office*